(12) United States Patent
Metzger

(10) Patent No.: US 8,364,547 B2
(45) Date of Patent: Jan. 29, 2013

(54) SYSTEM FOR REAL-TIME SALES AND INVENTORY RECONCILIATION

(75) Inventor: Tracy Alan Metzger, Elmhurst, IL (US)

(73) Assignee: Gate Gourmet Switzerland, GmbH, Zurich Airport (CH)

( * ) Notice: Subject to any disclaimer, the term of this patent is extended or adjusted under 35 U.S.C. 154(b) by 538 days.

(21) Appl. No.: 11/340,302

(22) Filed: Jan. 26, 2006

(65) Prior Publication Data

US 2006/0253338 A1 Nov. 9, 2006

Related U.S. Application Data

(63) Continuation-in-part of application No. 11/226,130, filed on Sep. 14, 2005, which is a continuation-in-part of application No. 10/802,558, filed on Mar. 17, 2004.

(60) Provisional application No. 60/455,290, filed on Mar. 17, 2003.

(51) Int. Cl.
*G06Q 30/00* (2012.01)
*G06F 17/60* (2006.01)

(52) U.S. Cl. .......................................... 705/26; 705/28

(58) Field of Classification Search ............... 705/26–28
See application file for complete search history.

(56) References Cited

U.S. PATENT DOCUMENTS

| | | | |
|---|---|---|---|
| 4,115,870 A | 9/1978 | Lowell | |
| 4,415,065 A | 11/1983 | Sandstedt | |
| 4,509,123 A | 4/1985 | Vereen | |
| 4,887,208 A | 12/1989 | Schneider et al. | |
| 5,057,677 A | 10/1991 | Bertagna et al. | |
| 5,151,581 A | 9/1992 | Krichever et al. | |
| 5,202,825 A | 4/1993 | Miller et al. | |
| 5,294,782 A | 3/1994 | Kumar | |
| D348,896 S | 7/1994 | Kumar et al. | |
| 5,448,046 A | 9/1995 | Swartz | |
| 5,679,943 A | 10/1997 | Schultz et al. | |
| 5,796,832 A | 8/1998 | Kawan | |
| D397,682 S | 9/1998 | Yotukura | |
| 5,869,825 A | 2/1999 | Ziarno | |
| 5,933,812 A | 8/1999 | Meyer et al. | |
| 5,940,807 A | 8/1999 | Purcell | |
| 5,971,274 A | 10/1999 | Milchman | |
| 5,979,757 A | 11/1999 | Tracy et al. | |
| 5,991,410 A | 11/1999 | Albert et al. | |
| 6,003,008 A | 12/1999 | Postrel et al. | |

(Continued)

FOREIGN PATENT DOCUMENTS

| | | |
|---|---|---|
| GB | 2363497 | 12/2001 |
| JP | 10069580 | 3/1998 |

(Continued)

OTHER PUBLICATIONS

"Method for Exchanging Information Between a Cash Register and a Payment-Processing Device", WO 96/38821 Andersson et al., May 30, 1995.*
Final Office Action for co-pending U.S. Appl. No. 11/226,130 dated Aug. 21, 2009.
Office Action dated Feb. 11, 2009 for Mexican Patent Application PA/a/2005/009813.

(Continued)

*Primary Examiner* — Garcia Ade
(74) *Attorney, Agent, or Firm* — McGuireWoods, LLP

(57) ABSTRACT

A system is presented that facilitates transactions for products to be completed and product inventory tracking to be performed in real-time even if the products are brought to the location of a customer prior to the transaction. The system completes transactions by accepting and settling cash, credit card, debit card and other forms of payment in real-time. In general, the system includes three basic components: an application module, a back office portal and a portable device. These components may be placed in communication with each other in various configurations to perform various functions that enable product tracking and transaction completion.

24 Claims, 7 Drawing Sheets

U.S. PATENT DOCUMENTS

| | | | |
|---|---|---|---|
| 6,006,100 | A | 12/1999 | Koenck et al. |
| 6,021,944 | A | 2/2000 | Arakaki |
| 6,095,410 | A | 8/2000 | Andersen et al. |
| 6,230,970 | B1 | 5/2001 | Walsh et al. |
| 6,234,389 | B1 | 5/2001 | Valliani et al. |
| 6,253,190 | B1 | 6/2001 | Sutherland |
| 6,341,268 | B2 | 1/2002 | Walker et al. |
| 6,351,689 | B1 | 2/2002 | Carr et al. |
| 6,550,683 | B1 | 4/2003 | Augustine |
| 6,587,835 | B1 | 7/2003 | Treyz et al. |
| 6,644,549 | B1 | 11/2003 | Swartz |
| 6,687,714 | B1 | 2/2004 | Kogen et al. |
| 6,714,969 | B1 | 3/2004 | Klein et al. |
| 6,825,766 | B2 | 11/2004 | Hewitt et al. |
| 6,856,820 | B1 | 2/2005 | Kolls |
| 6,866,195 | B2 | 3/2005 | Knowles et al. |
| 6,901,381 | B2 * | 5/2005 | Brown et al. ............ 705/28 |
| 7,016,764 | B2 | 3/2006 | Penkar et al. |
| 7,172,114 | B2 | 2/2007 | Fletcher et al. |
| 7,209,733 | B2 | 4/2007 | Ortiz et al. |
| 7,275,038 | B1 | 9/2007 | Weinstock et al. |
| 2002/0010633 | A1 | 1/2002 | Brotherston |
| 2002/0077974 | A1 | 6/2002 | Ortiz et al. |
| 2002/0116282 | A1 | 8/2002 | Martin et al. |
| 2002/0126780 | A1 | 9/2002 | Oshima et al. |
| 2003/0018532 | A1 | 1/2003 | Dudek et al. |
| 2003/0074320 | A1 | 4/2003 | Riggs |
| 2003/0083948 | A1 * | 5/2003 | Rodriguez et al. ............ 705/26 |
| 2003/0101108 | A1 | 5/2003 | Botham et al. |
| 2003/0182197 | A1 * | 9/2003 | Beckman ............ 705/26 |
| 2003/0191698 | A1 | 10/2003 | Brown et al. |
| 2004/0002902 | A1 | 1/2004 | Muehlhaeuser |
| 2004/0015403 | A1 * | 1/2004 | Moskowitz et al. ............ 705/26 |
| 2004/0066328 | A1 | 4/2004 | Galley et al. |
| 2004/0111286 | A1 * | 6/2004 | Koenig et al. ............ 705/1 |
| 2004/0128256 | A1 | 7/2004 | Krouse et al. |
| 2004/0143486 | A1 | 7/2004 | Yeow et al. |
| 2004/0143500 | A1 | 7/2004 | Lopez et al. |
| 2004/0186783 | A1 | 9/2004 | Knight et al. |
| 2005/0004838 | A1 | 1/2005 | Perkowski et al. |
| 2005/0055270 | A1 | 3/2005 | Broe |
| 2005/0144072 | A1 * | 6/2005 | Perkowski et al. ............ 705/14 |
| 2005/0199709 | A1 | 9/2005 | Linlor |
| 2005/0230472 | A1 | 10/2005 | Chang |
| 2005/0234778 | A1 | 10/2005 | Sperduti |
| 2005/0289020 | A1 | 12/2005 | Bruns et al. |
| 2006/0085293 | A1 | 4/2006 | Melucci |
| 2006/0149640 | A1 | 7/2006 | Gordon et al. |
| 2006/0253338 | A1 | 11/2006 | Metzger |
| 2006/0282345 | A1 | 12/2006 | Nelson |
| 2006/0289654 | A1 | 12/2006 | Robinson |
| 2007/0005459 | A1 | 1/2007 | Fowler |
| 2007/0033150 | A1 | 2/2007 | Nwosu |
| 2007/0038323 | A1 | 2/2007 | Slocum et al. |
| 2007/0124220 | A1 | 5/2007 | Griggs et al. |
| 2007/0156436 | A1 | 7/2007 | Fisher et al. |
| 2007/0156443 | A1 | 7/2007 | Gurvey |
| 2007/0198313 | A1 | 8/2007 | Carruthers |
| 2007/0198432 | A1 | 8/2007 | Pitroda et al. |
| 2007/0228163 | A1 | 10/2007 | Schon et al. |

FOREIGN PATENT DOCUMENTS

| | | |
|---|---|---|
| JP | 200276539 | 9/2003 |
| WO | WO 90/01199 | 2/1990 |
| WO | WO 9638821 | 12/1996 |
| WO | WO 02/18192 | 3/2002 |
| WO | WO 03017216 | 2/2003 |

OTHER PUBLICATIONS

Office Action dated Dec. 23, 2008 for U.S. Appl. No. 10/802,558.
Canadian Office Action issued on Aug. 2, 2010 for a related case Canadian Patent Application No. 2,518,895.
Witness Statement of Mr. Bernard Swindells, Managing Director of Novo IVC Limited, dated Apr. 25, 2006, 1 page.
Inn-Ventory Computers Ltd., "The Complete Duty Free Solution" brochure, undated but purportedly published in Jun. 1997, 8 pages.
Novo IVC Ltd., "SkyPos—The Mobile Point of Sale for the Airline Industry" brochure, undated but purportedly published in 1999, 12 pages.
Novo IVC Ltd., "TrackPos—The Mobile Point of Sale for the Railway Industry" brochure, undated but purportedly published in 1999, 12 pages.
Novo IVC Ltd., Pro Logistica—On-Board Sales Back Office Reconciliation System Overview, published in Nov. 2001, 10 pages.
Novo IVC Ltd., "Pro Logistica—A Ground Based Solution for On-Board Sales Operations" brochure, undated but purportedly published in 2002, 5 pages.
Novo Group Plc, "Pro Logistica" System Description, Version 2.2.X, dated Apr. 2002, 78 pages.
Novo Group Plc, "Pro Logistica" Installation Guide, Version 2.2.X, dated Apr. 2002, 13 pages.
Novo IVC Ltd., Touch PC User Guide for Saudi Arabian Airlines, undated but purportedly published in 2000, 23 pages.
Novo IVC Ltd., Touch PC Eagle data sheet, undated but purportedly published in 1999, 1 page.
Novo IVC Ltd., invoice for SkyPos On-Board Point of Sale System to SkyTeller LLC, dated Nov. 26, 1999, 1 page.
Novo IVC Ltd., invoice for SkyPos On-Board Point of Sale System to SkyTeller LLC, dated Dec. 20, 1999, 1 page.
Novo IVC Ltd., invoice for SkyPos On-Board Point of Sale System to SkyTeller LLC, dated Sep. 20, 2000, 1 page.
Novo IVC Ltd., invoice for SkyPos On-Board Point of Sale System to SkyTeller LLC, dated Sep. 29, 2000, 1 page.
Novo IVC Ltd., invoice for SkyPos On-Board Point of Sale System to American Airlines, dated Dec. 29, 2000, 1 page.
Novo IVC Ltd., invoice and purchase order for SkyPos On-Board Point of Sale System to Saudi Arabian Airlines, dated Aug. 31, 2000, 3 pages.
Novo IVC Ltd., Pro-Logistica back office software invoice for Saudi Arabian Airlines, dated Jul. 11, 2001, 1 page.
Novo IVC Ltd., Pro-Logistica back office software invoice for Gate Gourmet dated Jan. 1, 2003, 1 page.
Novo IVC Ltd., invoice to Sky Teller LLC for Saudi software on board POS System, dated Dec. 29, 2000, 1 page.
Novo IVC Ltd., Touch PC Eagle advertisement, unknown date, 1 page.
Assessment of Novelty and Inventive Step filed in EP 16 06753, by Anna Molony, dated Sep. 28, 2006, 13 pages.
International Search Report, PCT/US04/08014, dated Jun. 23, 2005, 3 pages.
Written Opinion of the International Searching Authority, International Application No. PCT/US2004/08014, mailed Jun. 23, 2005, 3 pages.

* cited by examiner

SYSTEM FOR REAL-TIME SALES AND INVENTORY RECONCILIATION

CROSS-REFERENCE TO RELATED PATENT APPLICATIONS

This patent application is a continuation-in-part of U.S. patent application Ser. No. 11/226,130, filed Sep. 14, 2005, which is a continuation-in-part of U.S. patent application Ser. No. 10/802,558, filed Mar. 17, 2004, which claims the benefit of U.S. Provisional Patent Application No. 60/455,290, filed Mar. 17, 2003, each of which is incorporated herein by reference.

BACKGROUND

An employer reportedly invented the mechanical cash register in 1879 to prevent sales clerks from stealing. More than a century later, the problems of accounting for retail sales proceeds and inventory persist. Salespeople are entrusted with valuable merchandise and the proceeds from sales. Problems continue to arise in attempting to hold individual salespeople accountable for their transactions. Accounting problems are particularly noticeable in circumstances where salespeople circulate among customers to transact sales, payment may not be settled until well after the customer has received the merchandise, and merchandize inventory is not easily tracked or managed.

Traditional payment terminals such as POS terminals available from companies including Verifone, Hypercom, Ingenico, Schlumberger or Lipman are basic in their operations and require specific skilled developers to modify terminal applications. In addition, these systems are not intended for mobile use and real-time inventory tracking.

Many facilities/venues are sensitive to the incremental profit added by product sales. Assuming that a significant fraction of the sales revenue currently lost to theft could be accounted for and retained, millions of dollars per year might be saved.

SUMMARY

A system for sales and inventory reconciliation (the "System") is described. The System completes and reconciles transactions for products by accepting cash, credit card, debit card and other forms of payment in real-time. In addition, the System enables management of product inventory in real-time. For example, the System may be implemented to enable an entity to sell products such as, food and beverage items, to customers. The System generally includes the following components: an application module, a back office portal and a portable device. These components may be in communication with each other in various configurations to form four basic data paths. In this manner, the System may perform various functions that enable product inventory tracking and transactions for products to be performed in real-time.

DETAILED DESCRIPTION

Figure 1A:
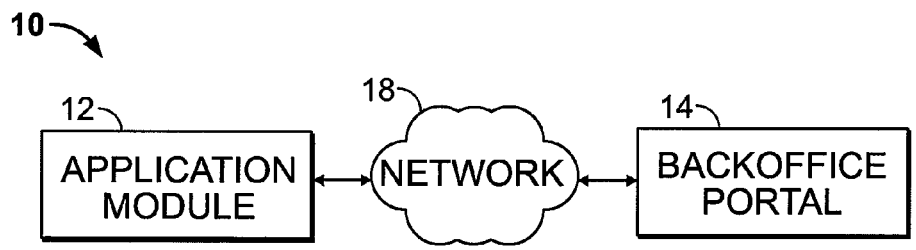
FIGS. 1A-1D are high level block diagrams of various configurations of a system for real-time sales and inventory reconciliation.

Referring to the figures, a system for sales and inventory reconciliation (the "System") is described. The System completes and reconciles transactions for products by accepting cash, credit card, debit card and other forms of payment in real-time. In addition, the System enables management of product inventory in real-time. In general, the System includes an application module, back office portal, and portable device, and promotes cash and non-cash transactions for products by enabling payment settlement and reconciliation, and product inventory accountability in real-time. For example, the System may be implemented to enable an entity, such as management, to sell products such as, food and beverage items, to customers, such as golfers and spectators on a golf course. The products may be provided by salespersons that travel around the golf course or fairway carrying the products and the portable device (for example, on foot, or on a golf cart or other vehicle). When the salesperson locates a customer that wishes to transact with the salesperson for a product, the salesperson can settle payment and supply the product to complete the transaction in real-time. Although the examples provided herein are presented in terms of providing products to customers on a golf course, the System and associated methods may also be implemented and adapted as needed for other facilities and/or venues in which salespeople travel to customers to enter into transactions for products and/or for which there is a need for real-time payment settlement and product management. Further, the system may vary slightly to accommodate the differing business practices and requirements of the one or more facilities/venues utilizing the system.

As shown in FIGS. 1A-1D, the System may include three general components including an application module 12, a back office portal 14 and a portable device 16. These components may be in communication with each other in various configurations to form four basic data paths. In this manner, the System may perform various functions that enable transactions for products to be performed in real-time. An example of such functions is shown in FIG. 2 and includes: setup 202, cart management 204, download to portable device 206, sales 208, payment 210, inventory control 212, post-transaction close-out 214, and reporting 216.

Figure 2:
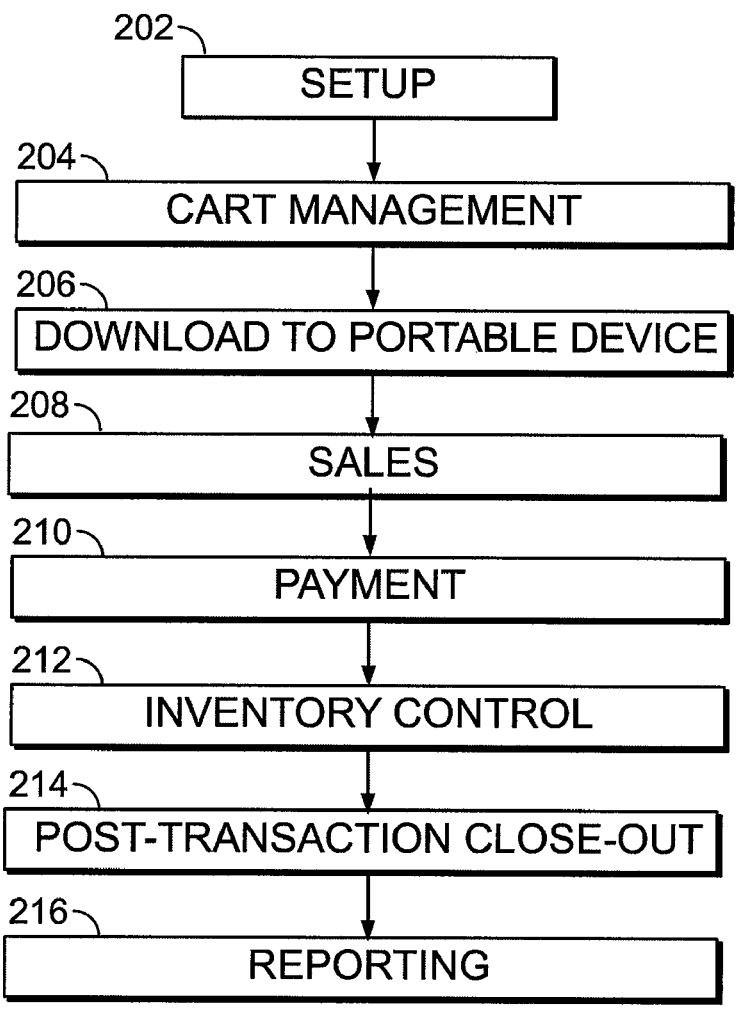
FIG. 2 is an exemplary block diagram of the functions enabled by the system of FIG. 1.
Figure 3:
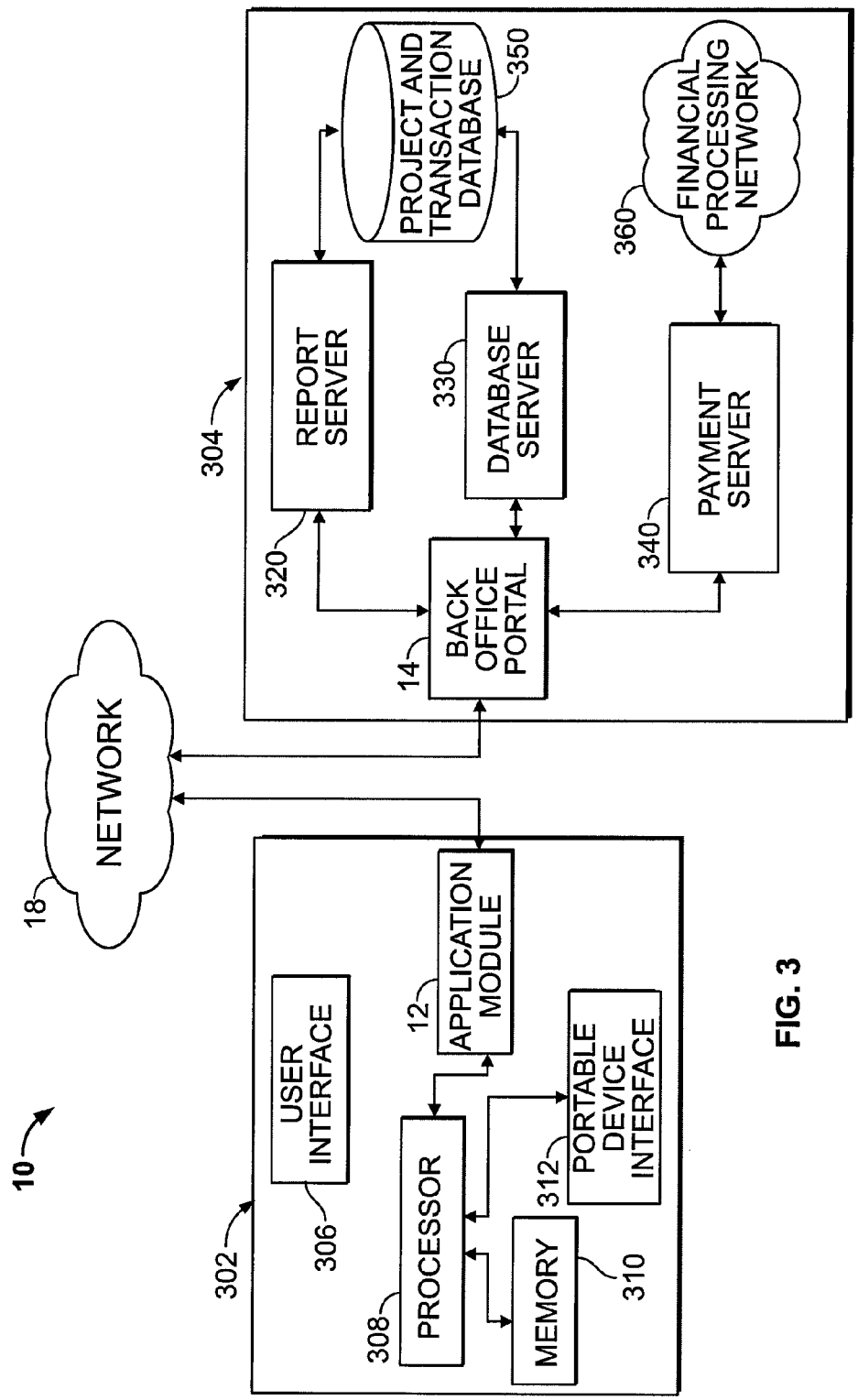
FIG. 3 is an exemplary block diagram of the configuration of FIG. 1A.

A configuration 10 of the components of the System is shown in FIG. 1A. In this configuration, the application module 12 is in communication with the back office portal 14, through a network 18, such as the Internet. As shown in FIG. 3, the application module 12 may be implemented in a computer 302. The computer is generally located in clubhouse, restaurant, or other site within the golf facility. The computer 302 may also include a user interface 306. The user interface 306 may include an input device and an output device (not shown). The output device may include any type of visual, manual, audio, electronic or electromagnetic device capable of communicating information from a processor or memory to a person or other processor or memory. Examples of output devices include monitors, speakers, liquid crystal displays, printers (such as laser, thermal and barcode printers), vibration devices, networks, buses, and interfaces. The input device may include any type of visual, manual, mechanical, audio, electronic, or electromagnetic device capable of communicating information from a person, or memory to a processor or memory. Examples of input devices include magnetic card readers, barcode scanners, optical character recognition systems, microphones, voice recognition systems, networks, buses, interfaces, keyboards, trackballs, mice, and other cursor-manipulating devices. Alternatively, the input and output devices may be included in a single device such as a touch screen, computer, processor, or memory coupled with the processor via a network.

Figure 1B:
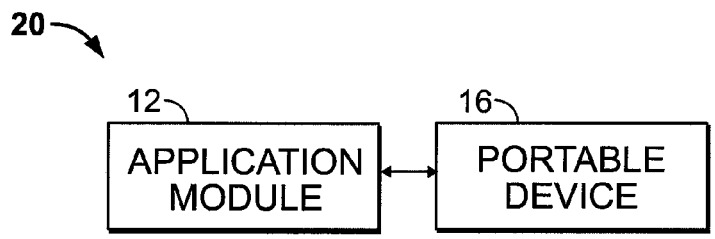

The computer 302 may further include a processor 308 and a computer-readable memory 310. The memory 310 may include any type of fixed or removable digital storage device and, if needed, a device for reading the digital storage device including, floppy disks and floppy drives, CD-ROM disks and drives, optical disks and drives, hard-drives, RAM, ROM and other devices for storing digital information. The processor 308 may include any type of device or devices used to process computer-readable instructions and/or digital information. In addition, the computer 302 may include a portable device interface 312, by which the application module 12 may be coupled with the portable device 16 (FIG. 1B). The application module 12 generally includes computer-readable software that includes instructions for communicating with the back office portal 14 and the portable device 16 (FIG. 1). The application module 12 may include a network interface, which, if the network 18 is the Internet, may include a web browser. The application module 12 may be stored in a memory, such as memory 310.

The back office portal 14 provides the application module 12 with access to the back office subsystem 304. The back office subsystem 304 may include one or more servers, such as, an application server 330, report server 320, and payment server 340. The subsystem 304 may include, for example, a Microsoft Internet Information Server platform utilizing the Microsoft ASP.NET framework. Additionally the subsystem 304 may include a firewall (not shown) or other security hardware and/or software. Further, the subsystem 304 may include a database 350, and may include a database management system (not shown), such as the SQL Server Enterprise Edition available from Microsoft. The back office subsystem 304 is generally operated and/or maintained by a facilitator. So that a particular golf facility may access the back office subsystem 304, the facilitator may establish the golf facility as a merchant in a financial application stored in, for example, the application server 330.

Referring to FIGS. 2 and 3, the data path between the application module 12 and the back office system 304 enables the setup 202 and cart management 204 functions. The setup function 202 may be performed using the application module 12. However, the changes made during setup 202 are generally stored in the database 350 of the back office subsystem 304. By performing the setup function 202, the System may be configured (setup) according to the needs and requirements of a particular golf facility. For example, assuming that the golf facility has been established as a merchant in the back office subsystem 304, users, categories (such as foods, beverages, souvenirs and novelty items), products included under the categories, and carts may be added, modified or deleted. In addition, information relating to complimentary products ("comps") or discounts on products or a total purchase ("coupons") may also be added, modified or deleted. For example, to add a user, the user must generally be assigned a role, such as an administrator or salesperson. Administrators generally have greater access to and the ability to change the configuration of the System than do sales people. In another example, to add a product, information, such as the name and description of the product, category under which the product falls, price, UPC code (Universal Product Code) and reorder points, may be included. Reorder points will be discussed below in connection with the inventory control function 212.

After the users, categories, products, and carts have been sufficiently defined, a user, such as an administrator, may configure (setup) the carts for a particular transactional period. The transactional time period may include a time period during which the salespeople are expected to be offering products to customers. Cart configuration may include determining the type and number of products (the "starting inventory"), and an amount of cash (for example, thirty dollars in one dollar bills) for making change (the "starting cash") that are to be loaded onto each cart. The starting inventory and starting cash may vary from cart to cart. For example, the starting inventory and/or starting cash may be determined by the management and/or as a function of historical data that accounts for sales history, customer demographics, and number of customers anticipated, among other factors. Once the starting inventory has been determined, barcodes reflecting the UPC code of the products included in the starting inventory may be printed and attached to the corresponding products for price identification and inventory management. Cart configuration may also include assigning particular salespeople to particular carts. All the configuration (setup) information may be communicated to the back office subsystem 304 using the application module 12.

The cart management function 204 may be performed according to the cart configuration produced during the setup function 202. The cart management function 204 generally includes loading the starting inventory (which may include UPC barcodes) and starting cash onto the associated carts. The salesperson assigned to the cart and/or management may verify or reevaluate the starting inventory and cash loaded onto the cart. If any changes are made to the starting inventory or starting cash loaded onto the cart, the changes may be entered into the application module 12. The salesperson and/or management may also verify that the portable device is fully charged and, if the portable device 16 includes a printer, stocked with paper for printing receipts.

Figure 4:
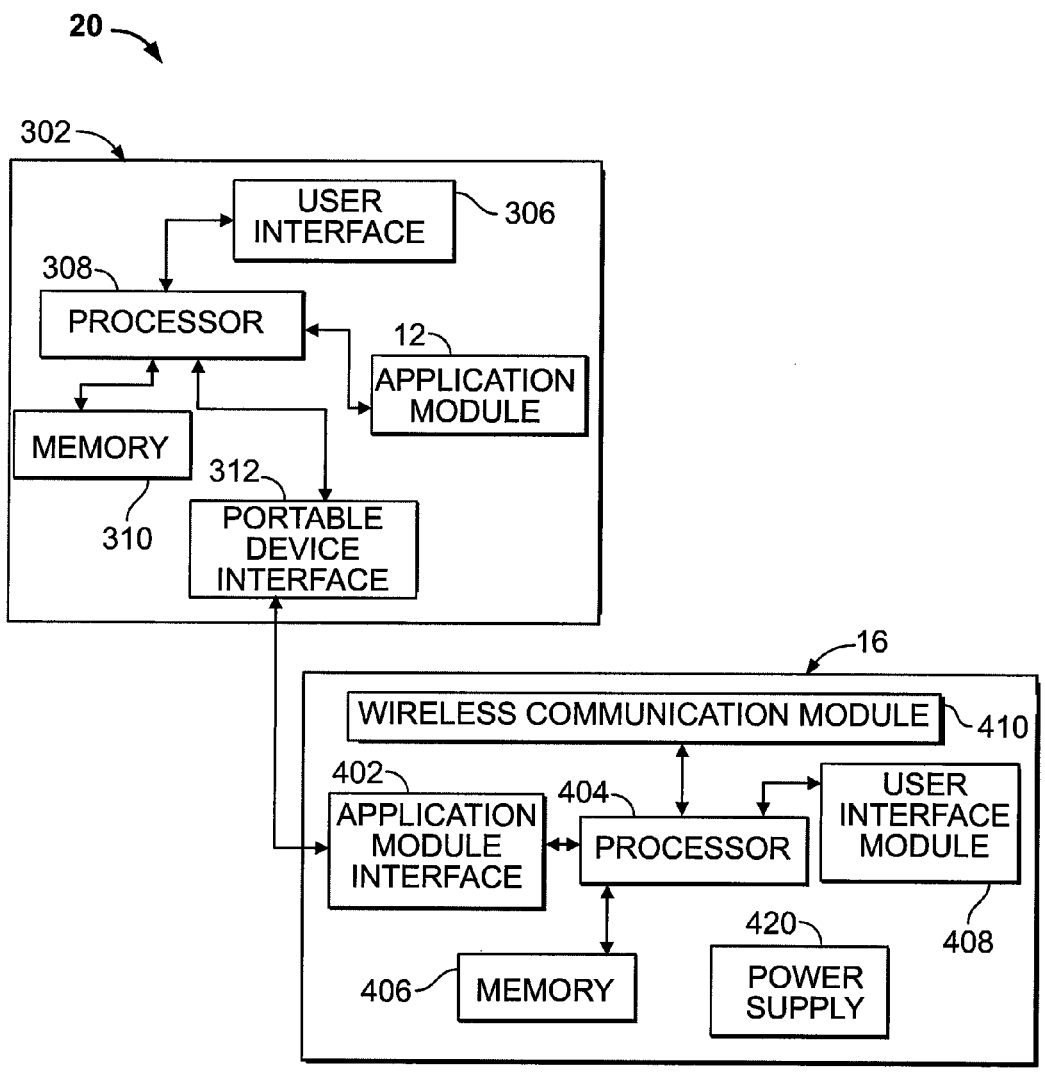
FIG. 4 is an exemplary block diagram of the configuration of FIG. 1B.

To download predetermined information, such as cart, product, cash, reorder point and salesperson information to the portable device 16 (perform the download function 206, FIG. 2), the portable device 16 and the application module 12 may be placed in the configuration shown in FIG. 1B. In this configuration, which is shown in greater detail in FIG. 4, the portable device 16 and the application module 12 are placed in communication with each other, thus creating a data path across which the predetermined information may be communicated. The portable device 16 and the application module 12 may be placed in communication with each other via wired or wireless electromagnetic channels. For example, the portable device 16 may include an application module interface 402, which may communicate with the portable device interface 312 of the computer 302.

The portable device 16 may also include a processor 404, memory 406, and a portable, chargeable or disposable power supply 420, such as a battery. The memory 406 may include any type of fixed or removable digital storage device and, if needed, a device for reading the digital storage device. The processor 404 may include any type of device or devices used to process computer-readable instructions and/or digital information. In addition, the portable device 16 may include a user interface module 408. The user interface module 408 may include an input device and an output device (not shown). The output device may include any type of visual, manual, or audio device capable of communicating information from a processor or memory to a person. Examples of output devices include speakers, vibration devices, printers and liquid crystal displays. The input device may include any type of visual, manual, mechanical, or audio device capable of communicating information from a person to a processor or memory. Examples of input devices include magnetic card readers, barcode scanners, optical character recognition systems, microphones, voice recognition systems, keyboards, trackballs, and other cursor-manipulating devices. Alternatively, the input and output devices may be included in a single device such as a touch screen. Further, the portable device 16 may include a wireless communication module 410, the use of which enables the portable device 16 to be in communication with the back office portal 14 (FIG. 1A).

Figure 5:
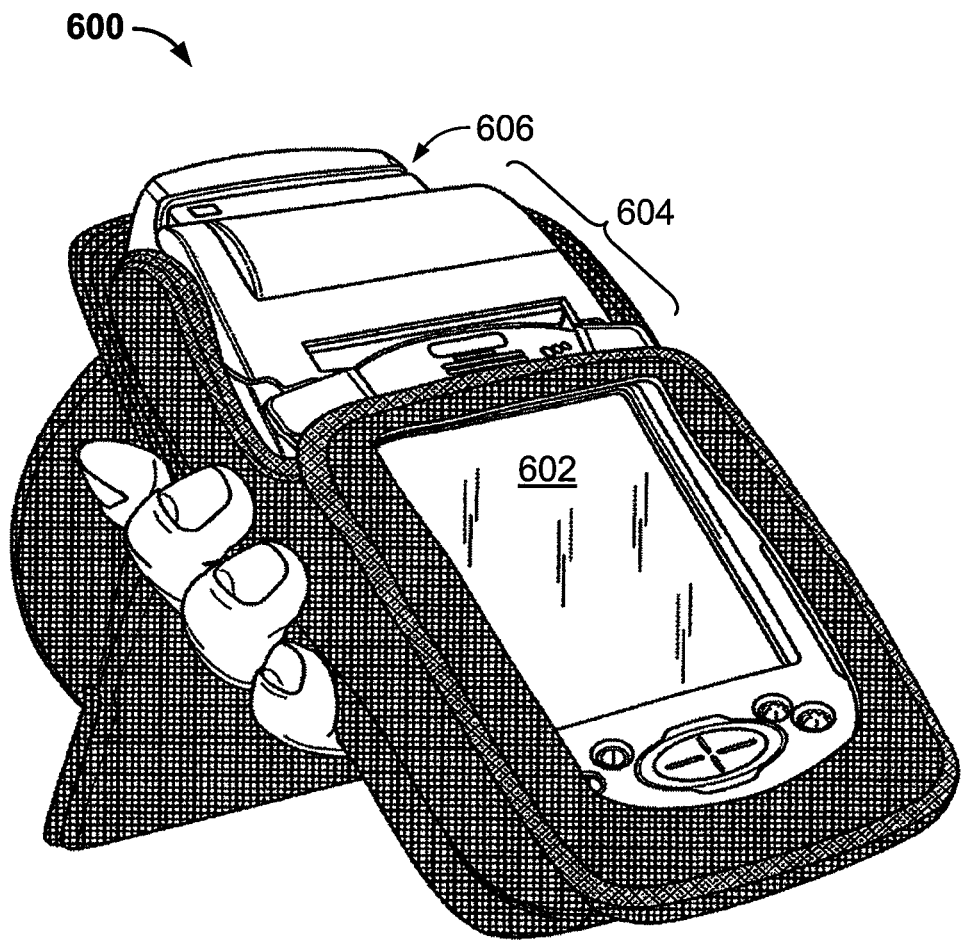
FIG. 5 is an isometric view of an exemplary portable device.

An example of a portable device 600 is shown in FIG. 5. As shown, the user interface module of the portable device 600 includes a touch screen 602, a printer 604, and a magnetic card reader 606. The information stored on or received by the portable device 600 may be arranged into logically linked menus that are accessible to a salesperson or customer through the touch screen 602. The magnetic card reader 606 may be used to identify a salesperson by reading the information magnetically encoded on a salesperson identification card. Likewise, the magnetic card reader 606 may be used to obtain payment from a customer purchasing products by reading the information magnetically encoded on the customer's credit, smart or debit card, or on a coupon or comp. The portable device 16 may include a personal digital assistant (PDA), such those produced by Hewlett Packard®, and Palm®. The portable device 600 may also include point-of-sale-type (POS-type) or other software that is operative to record sales and inventory transactions among other things. Further, some of the input and output devices may not be included in the same housing as the remainder of the portable device 600. For example, if the portable device does not include a printer and/or card reader, the portable device may be coupled with a detachable printer and/or a reader or with a detachable combination printer/card reader module, such as those available from Infinite Peripheral Inc.

Figure 6:
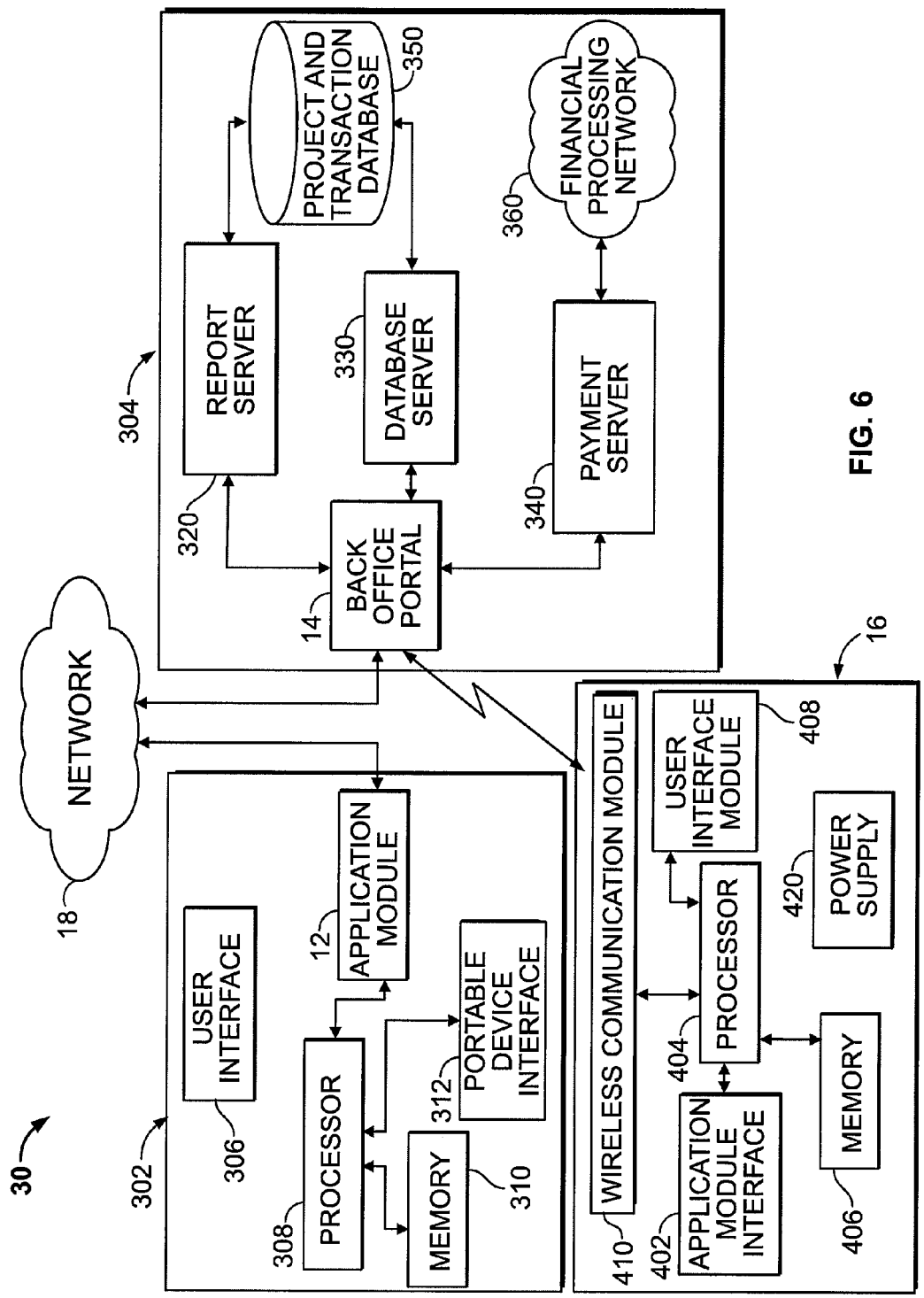
FIG. 6 is an exemplary block diagram of the configuration of FIG. 1C.

Referring to FIG. 2 and FIG. 6, a salesperson may need to login to the portable device 16 to use the portable device 16. The information provided to the portable device 16 by the salesperson may be checked against the salesperson information loaded into the portable device 16 during the download phase 206. For example, the salesperson may enter a pass code into, or swipe an identification card through the portable device 16, depending on the nature of the user interface module 408. If the information provided by the salesperson is consistent with that downloaded into the portable device 16, the salesperson will be granted access to the functions of the portable device 16.

So that the System may enable performance of the sales 208, payment 210, and inventory control 212 functions, the portable device 16, back office portal 14 and the application module 12 may be placed in the configuration shown in FIG. 1B and FIG. 6. In this configuration 30, the portable device 16 and the application module 12 may be in communication with the back office portal 14 of the back office subsystem 304. The communication between the application module 12 and the back office portal 14 may be accomplished as previously described. The communication between the portable device 16 and the back office portal 14 is generally made via a wireless network. For example, the communication may be made via a fixed cellular network, such as WiFi, or a mobile cellular network, such as CDMA. Whether communication is made via a fixed or mobile cellular network, the wireless communication module 410 of the portable device 16 should be compatible with the network used. The same holds true for the back office portal 14 of the back office subsystem 304.

The salesperson may take the cart, including the starting inventory, starting cash, and the portable device 16 to which the salesperson is associated, and travel around the golf course or fairway. The salesperson may travel according to a pre-determined plan set forth by the management or other entity, or according to a random pattern. On the fairway, the salesperson may approach or be approached by a customer to enter into a transaction for one or more of the products carried by the salesperson. The salesperson completes the transaction by selling one or more products to the customer (the sales function 208 of FIG. 2) and settling the payment in real-time (the payment function 210 of FIG. 2). The sales function 208 (FIG. 2) generally involves determining the payment due from the customer to pay for the products selected by the customer. The salesperson may use the portable device 16 to scan the barcode on the products to access the associated product information, such as the price, and to track the products being sold. If the portable device 16 does not include a barcode scanner or if the scanner is not operating, the salesperson may manually enter or select the product from a list or menu presented on, for example, a touch screen on the portable device 16. When the products chosen by the customer have been entered into the portable device 16, the portable device 16 may calculate the total price for the products. If the customer has coupons or comps, these may be entered into the portable device 16 and their value subtracted from the total price to revise the total price. Coupons or comps may be entered manually or by scanning if they include a barcode or a strip with magnetically encoded information.

To complete the transaction, payment for the products must be settled. A customer may pay for products using cash, credit, debit or smart cards, or by establishing a tab. If the customer pays in cash, the salesperson may enter the amount of cash provided by the customer into the portable device 16. The portable device 16 may record the amount paid in memory 406, and may calculate the change due using processor 404. If change is due, the salesperson may provide the change to the customer from the cash stored in the cart. Further, if the customer provides a tip to the salesperson, the amount of the tip may also be entered into the portable device 16.

If the customer elects to pay for the products using a credit, debit or smart card, the card information is collected via the portable device 16, and communicated through the back office subsystem 304 for authorization. The authorization decision is made and communicated back through the back office subsystem 304 to the portable device 16 in real-time. The credit, debit or smart card information may be entered into the portable device 16 by swiping the card through a magnetic card reader or by manually entering the information. The customer may add a tip to the amount due by entering the tip amount into the portable device 16. The card information, along with the amount due, may be communicated by the wireless communication module 410 of the portable device 16 over a fixed or mobile wireless network to the back office portal 14. Through the back office portal 14, the card information and amount due may be communicated to a payment server 340, which communicates the information to a card clearinghouse or settlement facility via the back office subsystem's financial processing network 360. The card clearinghouse or settlement facility may approve or reject the card and the back office subsystem 304 generally communicates the approval or rejection to the portable device 16 in real-time. If the card is authorized, the portable device 16 may capture the customer's signature via a touch screen to confirm the charge. However, if the fixed or mobile wireless network is unavailable, the portable device 16 may store the card information in memory 406 for settlement at a later time.

If a customer elects to pay for the products using a tab, a tab may be opened the first time payment is to be made in this manner. To open a tab, authorization for a charge of a nominal amount, such as one dollar, may be obtained for one of the customer's credit cards. This authorization may be obtained in real-time as previously described above. In addition, the tab may be given a unique name so that it may be identified for further purchases and/or closeout. For example, the tab may be assigned the number of the cart used by the customer, or given some other unique alpha-numeric character string. For additional purchases, the unique name may be entered into the portable device 16 and the charges for additional products are added to the existing charges on the tab. To close out the tab, payment may be made using credit, debit or smart cards, or cash as described above. Regardless of the manner in which payment is made, the portable device 16 may produce a receipt for the customer.

Figure 1C:
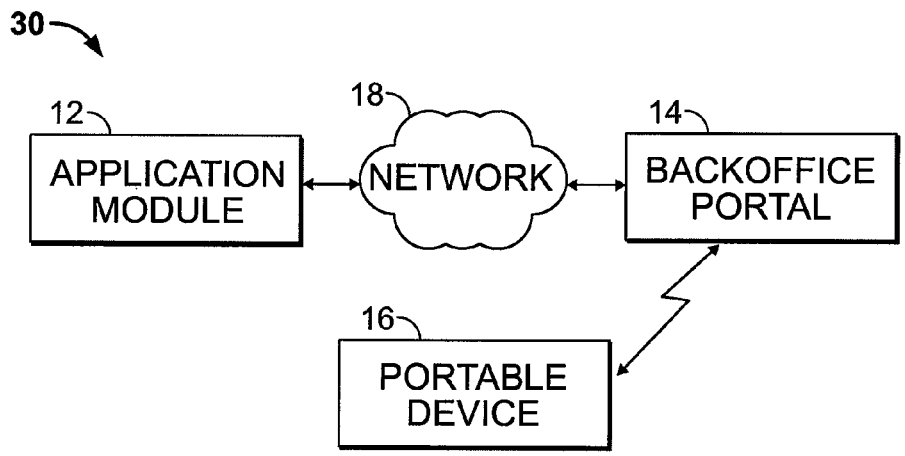
Figure 1D:
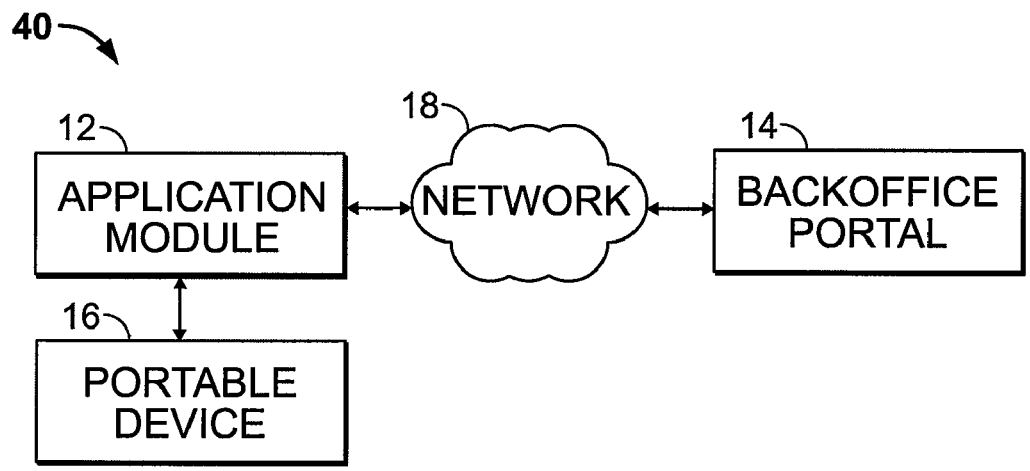

As previously stated, the System configuration shown in FIG. 1C and FIG. 6 enables the inventory management function to be performed. For example, when the first sale is made from a particular cart, the memory 406 of the portable device 16 associated with that cart may record the types of product and number of each type sold, via barcode scan or manual input, as previously described. The wireless communication module 410 communicates this information to the database server 330 of the back office subsystem 304 via the back office portal 14. For each type of product sold, the database server 330 retrieves the number of products included in the starting inventory from the product and transactional database 350. The database server 330 then subtracts the number of products sold from the number of products included in the starting inventory for each type of product sold. In this manner, the current cart inventory may be tracked by the database server 330. Further, when the number of a particular type of products falls below the reorder point specified during the setup process 202 (FIG. 2), the back office subsystem 304 will communicate a warning to the salesperson through the portable device 16 regarding the number of the particular product type. This warning may indicate to the salesperson that they should return to a specified location to restock the particular product. In addition, the warning may be communicated to the application module 12 so that the products needed for restocking may be organized prior to the arrival of the cart.

Figure 7:
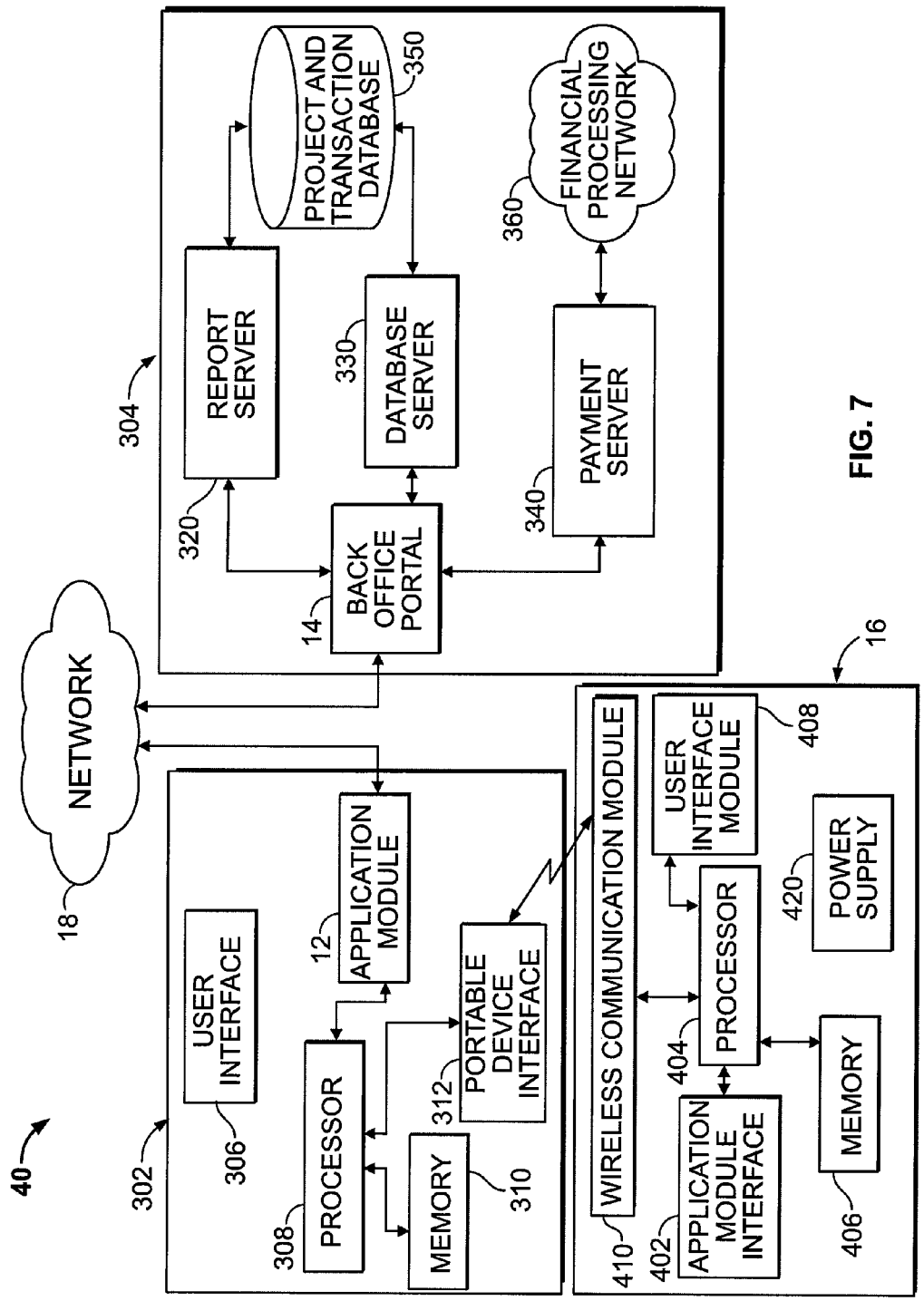
FIG. 7 is an exemplary block diagram of the configuration of FIG. 1D.

At the end of a transaction period, or at any other designated or appropriate time, the salesperson may return the cart to a designated location for the post-transaction close-out 214 and reporting 216 (FIG. 2) functions. To enable the post-transaction close-out function to be performed, the portable device 16, back office portal 14 and the application module 12 are generally placed into the configuration shown in FIG. 1D and FIG. 7. The post-transaction close-out function 214 may include management verifying that the cash returned, and inventory remaining on the cart is consistent with the products sold as indicated on the portable device 16 or the back office subsystem 304. In addition, any credit, debit, or smart card transaction that was not settled in real-time due to connectivity or other factors, as well as any tabs not formally closed by a customer. May be communicated from the portable device 16 to the application module 12 and then to the back office subsystem 304 via the back office portal 14 for settlement.

In a similar manner, any information not communicated from the portable device 16 to the back office subsystem 304 due to connectivity issues or other factors, may be communicated to the back office subsystem 304 via the application module 12 and the back office portal 14. The database server 330 may use this information to update information stored in the product and transactional database 350. Thus, during the performance of the reporting function 216 (FIG. 2) the report server 320 may access accurate information from which to create reports as requested through the application module 12.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system for processing a transaction between a merchant in possession of products and a customer for one of the products, the system comprising:
a back office subsystem;
a personal digital assistant (PDA) configured to collect transaction information from the customer, selectively communicate the transaction information to the back office subsystem, which processes the transaction and performs inventory tracking, and receive the processed transaction information in real-time; and
an application module configured for selective communication with the PDA;
wherein said PDA is further configured to generate at least one tab for at least one customer to track purchases and payments due at the point of sale, associate a unique identifier with the tab, and obtain authorization in real-time for a form of payment provided by customer.

2. The system of claim 1, wherein the PDA includes an input module configured to collect the transaction information from the customer.

3. The system of claim 2, wherein the input module includes a magnetic card reader, barcode scanner, keyboard, and/or touchpad.

4. The system of claim 1, wherein the transaction information includes transaction acceptance information, and the PDA is further configured to communicate the transaction acceptance information to the back office subsystem for processing in real-time.

5. The system of claim 4, wherein the PDA is further configured to receive a result of the transaction acceptance information processing from the back office in real-time.

6. The system of claim 1, wherein the PDA is further configured for selective communication with the application module.

7. The system of claim 6, wherein the application module is further configured to communicate initial product information to the PDA.

8. The system of claim 6, wherein the transaction information includes product information and the PDA is further configured to communicate product information to and receive updated product information from the back office subsystem in real-time.

9. The system of claim 8, wherein the product information includes a number of the products transacted for and the back office subsystem tracks a number of the products remaining in the merchant's possession according to the product information.

10. A method for processing a transaction between a merchant in possession of products and a customer for one of the products, the system comprising:
- providing a personal digital assistant (PDA) to the merchant, wherein the PDA is configured to receive transaction information from the customer; and
- providing the PDA wireless access to a back office subsystem that is configured to receive and/or process the transaction information and inventory tracking in real-time,
- wherein said PDA is further configured to generate at least one tab for at least one customer to track purchases and payments due at the point of sale, associate a unique identifier with the tab, and obtain authorization in real-time for a form of payment provided by customer.

11. The method of claim 10, wherein processing the transaction in real-time includes communicating the transaction information from the back office subsystem to a financial processing network for settlement of the transaction.

12. The method of claim 11, wherein processing the transaction in real-time includes communicating information relating to settlement of the transaction from the back office subsystem to the PDA in real-time.

13. The method of claim 10 further comprising supplying an application module to a merchant.

14. The method of claim 13 further comprising providing the application module with access to the back office subsystem.

15. A method for processing a transaction between a merchant in possession of products and a customer for one of the products, the system comprising:
- collecting transaction information from the customer using a personal digital assistant (PDA);
- generating at least one tab for at least one customer to track purchases and payments due at the point of sale;
- wirelessly communicating the transaction information from the PDA to a back office subsystem; and
- processing the transaction and performing inventory tracking in real-time using the back office subsystem,
- wherein generating the at least one tab further includes:
  - associating a unique identifier with the tab, and
  - obtaining authorization in real-time for a form of payment provided by customer.

16. The method of claim 15 further comprising communicating the transaction information to an application module.

17. The method of claim 15 further comprising configuring the PDA.

18. The method of claim 17, wherein configuring the PDA includes communicating initial information to the PDA.

19. The system of claim 1, wherein the PDA tab is closed out after customer purchases are complete and payment has been received.

20. The method of claim 10, wherein the PDA tab is closed out after customer purchases are complete and payment has been received.

21. The method of claim 15, wherein the PDA tab is closed out after customer purchases are complete and payment has been received.

22. The system of claim 1, wherein the PDA tab for each customer is associated with a unique identifier comprising at least one of: customer name; cart or other number; and unique alpha-numeric character string.

23. The method of claim 10, wherein the PDA tab for each customer is associated with a unique identifier comprising at least one of: customer name; cart or other number; and unique alpha-numeric character string.

24. The method of claim 15, wherein the PDA tab for each customer is associated with a unique identifier comprising at least one of: customer name; cart or other number; and unique alpha-numeric character string.

* * * * *